US012094367B2

(12) United States Patent
Pomerantz

(10) Patent No.: US 12,094,367 B2
(45) Date of Patent: Sep. 17, 2024

(54) APPARATUS FOR INHIBITING DISLOCATION OF AN ELECTRONIC SHELF LABEL (ESL) ASSEMBLY

(71) Applicant: Carl Pomerantz, Beaconsfield (CA)

(72) Inventor: Carl Pomerantz, Beaconsfield (CA)

( * ) Notice: Subject to any disclaimer, the term of this patent is extended or adjusted under 35 U.S.C. 154(b) by 104 days.

(21) Appl. No.: 18/085,267

(22) Filed: Dec. 20, 2022

(65) Prior Publication Data

US 2023/0215300 A1 Jul. 6, 2023

Related U.S. Application Data

(60) Provisional application No. 63/361,526, filed on Jan. 6, 2022.

(51) Int. Cl.
*G09F 3/20* (2006.01)
*A47F 5/08* (2006.01)

(52) U.S. Cl.
CPC ............ *G09F 3/204* (2013.01); *A47F 5/0869* (2013.01); *G09F 3/208* (2013.01)

(58) Field of Classification Search
CPC ......... G09F 3/204; G09F 3/208; A47F 5/0869
See application file for complete search history.

(56) References Cited

U.S. PATENT DOCUMENTS

| | | | | |
|---|---|---|---|---|
| 6,035,569 A * | 3/2000 | Nagel | A47F 5/0068 40/658 |
| 6,126,125 A * | 10/2000 | Dalton | G09F 3/204 248/205.2 |
| 6,367,752 B1 * | 4/2002 | Forsythe | G09F 3/204 248/220.21 |
| 2014/0208625 A1 * | 7/2014 | Kirby | G09F 3/18 40/658 |
| 2020/0074891 A1 * | 3/2020 | Bühlmeyer | H02G 3/0437 |

* cited by examiner

*Primary Examiner* — Gary C Hoge

(57) ABSTRACT

Apparatus firmly holds and protects an ESL (Electronic Shelf Label) assembly (ESL attached to a basket clip) installed onto a retail basket wire member so that the ESL assembly is prevented from being dislocated off the wire member by impact or disturbance. Apparatus confines the ESL assembly on a retail basket wire member with a rear lip engaged behind the rear portion of the basket clip, and a front face that engages with the front face of the ESL. A bottom tongue engages with the bottom edge of the ESL to immobilize apparatus on ESL assembly. Apparatus has two protruding shoulders or a friction coating to prevent horizontal dislocation of apparatus off ESL assembly. Another embodiment of apparatus in the form of a strip is adapted to engage with a plurality of ESL assemblies. Apparatus has holes so it can be additionally immobilized onto the wire member with fasteners.

20 Claims, 13 Drawing Sheets

APPARATUS FOR INHIBITING DISLOCATION OF AN ELECTRONIC SHELF LABEL (ESL) ASSEMBLY

This application claims the priority of U.S. Provisional patent application No. 63/361,526, filed on Jan. 6, 2022.

The disclosed invention protects electronic shelf label (ESL) assemblies from dislocation and damage by customers, staff, and equipment. It is easily installed without tools onto any ESL assembly (ESL attached to a basket clip) mounted onto a wire basket, and can be quickly removed.

BACKGROUND

In retail, items need to be priced so that shoppers/clients can be made aware of an item's price prior to purchase. Up until the latter part of the twentieth century, most retailers ticketed individual products with pricing by adhering a pricing label on each individual item. This was a clear way for customers to know pricing, but was very labor intensive for store personnel to do. It was also very complex to logistically control price changes.

Towards the end of the century, new merchandizing methods were developed so that ticketing individual items with pricing was replaced by placing a label or sticker on the shelf edge or merchandizing peg, so that all products behind or above the price ticket (commonly known as a bin ticket) had this bin ticketed price. This "single price label per group" change represented a major labor savings to the retailer.

With advancements in technology at the end of the century, it has become possible to replace these formerly paper, cardstock, or stickered price labels, with Electronic Shelf Labels (commonly referred to as ESL'S).

ESL systems provide for significant operational labor savings to the retailer. With traditional paper bin tickets, every time a price change occurs, there is data entry to register the price change, plus new bin tickets have to be printed, sorted, old tickets removed, and new tickets manually inserted. Labor time involved on average is estimated at several minutes per label price change.

With ESLs, price changes can be wirelessly conducted, and can be automatically and electronically updated and changed. Furthermore, the ESLs themselves can also display additional data beyond price, such as inventory information. Accuracy of information is improved. Within seconds, prices on the ESL's can be electronically updated across multiple systems, so pricing can quickly be changed to stay competitive and match the competition.

This yields improved retailer productivity, pricing accuracy, and price agility for the retailer. Further benefits and goals are improved promotional opportunities and better communication of pricing information to shoppers.

For example, if a retailer has items that they want to feature for Sale or Clearance, they can centrally and remotely alter all pricing displayed on the ESLs for these items. Some ESLs further allow the face of the display itself to change color and add electronic graphics in an attempt to more strongly signal, differentiate, and highlight these specials to customers.

Stores also often feature baskets for products with a front grill or wire grill face that affixes to the top front edge of the shelf.

An ESL's exterior is typically comprised of a molded housing, featuring engaging tabs on its upper and lower inside edges. The retailer uses a basket clip with lips on its front that retain the upper and lower edges of the ESL's engaging tabs, and a basket-engaging portion on the back of the basket clip that is installed onto a wire member of a display basket. While it is important that the ESL engages firmly into the basket clip's lips, it is problematic if this fit is too loose and may result in ESL's dislocation if bumped by a customer or passer-by. The ESL will simply slide out of the basket clip.

Another consideration is the basket-engaging portion on the back of the basket clip: if the wire basket member is too narrow or basket-engaging portion is too flimsy, the basket-engaging portion will not grip the basket member adequately enough to prevent dislocation of the entire ESL assembly.

An ESL's interior comprises a battery, a display face, and sophisticated, miniaturized internal electronics. All of this is housed in a relatively, somewhat fragile, plastic molded housing. In the course of normal activity in a store, the ESL on a basket member can be subject to significant physical disturbance by shoppers and store personnel. One form of disturbance is via direct impact, for example from a shopping cart, or a store associate's stock fulfilling cart or lift truck, or jigger used while moving skidded merchandise. Other examples of disturbances include ESLs accidentally being hit by shoppers or store personnel when people place or remove merchandise, or simply by people accidentally bumping into the ESLs when walking by too close to the ESLs. As well, ESL disturbance occurs by the cleaning personnel while using floor cleaning, mopping, sweeping and buffing equipment. Also, when ESL assemblies are easy to displace, customers can be inclined to simply slide or displace them as a form of absent-minded fidgeting. In some cases, a direct heavy impact can immediately break the ESL. A more lateral collision can lead to lateral displacement of the ESL, either from the clip, or the ESL and clip assembly can be together laterally displaced. In other instances, a lateral hit can result in the ESL detaching from the clip, and the ESL falling to the floor, or into the shelf. The clip remains empty in place, while the ESL might break on impact on the floor, or be run over or stepped on and broken, or is simply lost or misplaced.

In other instances, the ESL remains attached to the clip, and both are dislodged as a unit, and slide literally, or fall and break or are lost. In other instances, both are dislodged and separated. In all of these and other examples of ESL disturbance, displacement and dislodgement, and breakages, the central and most critically important function of the ESL, which is to accurately display the pricing in front of the appropriate group of articles, is rendered completely dysfunctional. A displaced or broken ESL therefore creates costly operational chaos for the retailer, and for their shoppers.

Needless to say, a dislocated ESL or ESL assembly is highly undesirable for a retailer, requiring labor and expenditures to reinstall another ESL on the missing basket. Considering differences in basket clip manufacturing tolerances, loosely-fitting basket clip lips and poorly-gripping basket-engaging portions are not uncommon in the field, causing productivity losses and unnecessary expenses for the retailer.

OBJECT OF THE PRESENT INVENTION

The object of this invention is to provide an improved means of protecting the ESL assembly against impact, disturbance, dislocation, displacement, or dislodgement.

The invention quickly attaches onto the ESL grill assembly so that it serves to protect the ESL from damage due to blunt impact. It also serves to more firmly attach the ESL to the basket clip itself so that the ESL is precluded from being dislocated or laterally displaced from the clip. The invention also serves to reinforce the union between the basket clip's basket-engagement portion and the basket member so that the combined ESL assembly is much less prone to being dislocated, displaced, or detached from the basket member.

As well, the invention can feature holes so that, for particularly heavy, disturbance prone, and high traffic zones, the invention and assemblage can be tie-wrapped onto the basket member as a unit to be even more resistant to lateral dislocation, displacement, or dislodgement.

In one embodiment, the invention is made of clear and resilient plastic, proportioned so that it can be quickly snapped onto the ESL assembly by placing it over the top of the ESL basket clip and then snapping it in place via at least one ESL bottom-engaging tongue.

The invention can also include lateral sliding prevention means such as shoulders on either side of the clip so that lateral movement between the invention, ESL, and basket clip is precluded.

It is an important feature of the present invention to tightly sandwich the ESL on its basket clip to the basket member so that the invention firmly squeezes the basket clip's basket-engagement portion onto the grill to prevent dislocation.

The invention can also feature rounded corners for safety and to prevent snagging by passing customers, personnel, and equipment. Material can be strong enough to absorb and protect the ESL from impact, and must be clear so as not to obstruct clarity of the ESL's digital display. It also must not obscure in the scanning of the ESL's from employee's hand-held barcode scanners. The invention can be sized to fit and protect individual ESLs.

In situations where multiple ESLs are closely adjacent to one another, the invention can be made longer so that it spans multiple ESLs as one monolithic strip. If there are dividers between products behind the grill, the back flap detailing of the invention can be notched or otherwise detailed to accommodate and traverse these dividers. In another variant, if a long embodiment is provided to a store without notches to accommodate the dividers, the store can install the long embodiment upside-down to avoid the problem of the fit between the long embodiment and dividers.

In addition to ESLs in grill-fixturing situations, the invention can be modified and sized to protect ESLs that are on peghooks from impact, displacement and dislodgement.

In some cases, retailers use several different sized ESLs throughout the store. The invention can be sized to be compatible for each size, or can be sized to universally fit and be compatible across a multitude of sizes.

DETAILED DESCRIPTION OF THE PREFERRED EMBODIMENTS

The present invention protects an Electronic Shelf Label assembly (ESL assembly) from being dislocated or dislodged off wire baskets by people and equipment. It also protects an Electronic Shelf Label (ESL) from being damaged by impact.

Figure 1:
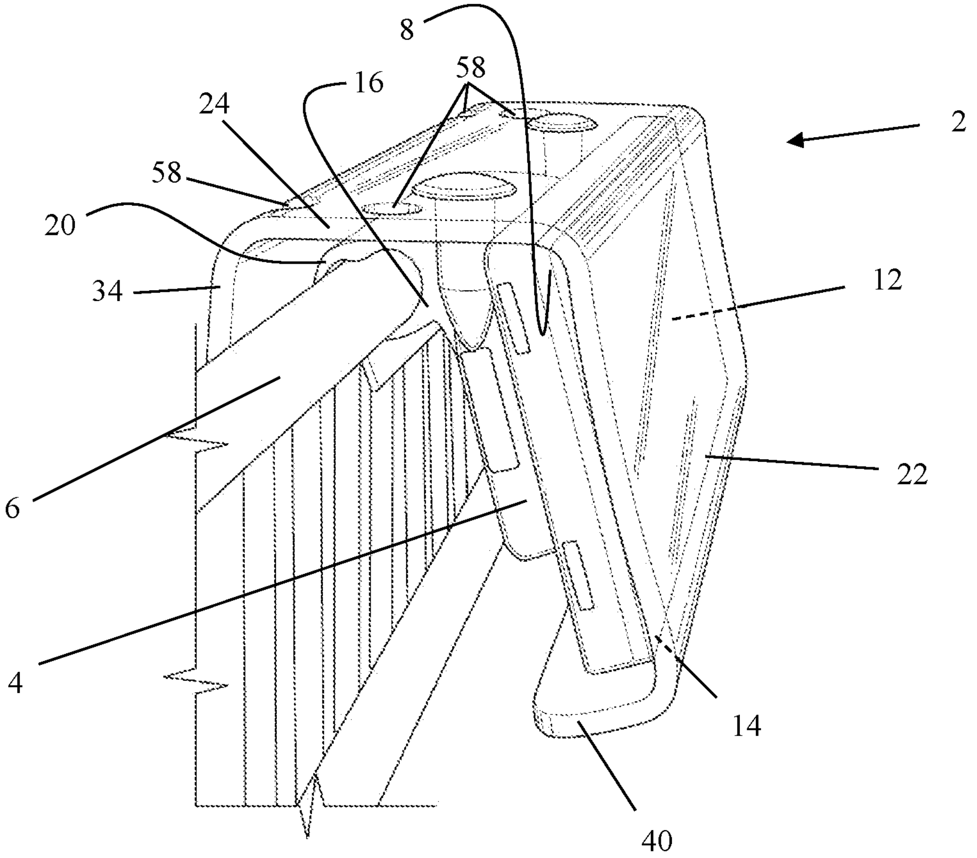
FIG. 1 is a perspective side view of the first embodiment of the present invention attached to an ESL assembly.

Referring now to Figures, FIG. 1 shows a perspective view of the first embodiment of the present invention, apparatus 2, installed on an ESL assembly 4 that is attached to wire basket member 6. Member 6 is typically a cylindrical rod that is located at the front top of a retail basket 5, basket 5 containing products 70 for sale (as seen on FIG. 7). Apparatus 2 comprises a planar rear lip 34, connected to planar short section 24, which is connected to planar long section 22, which is connected to planar bottom tongue 40. In the preferred embodiment, all connections are substantially at 90 degrees. In the preferred embodiment, apparatus 2 is made of a clear, durable, and resilient material such as plastic.

Figure 2:
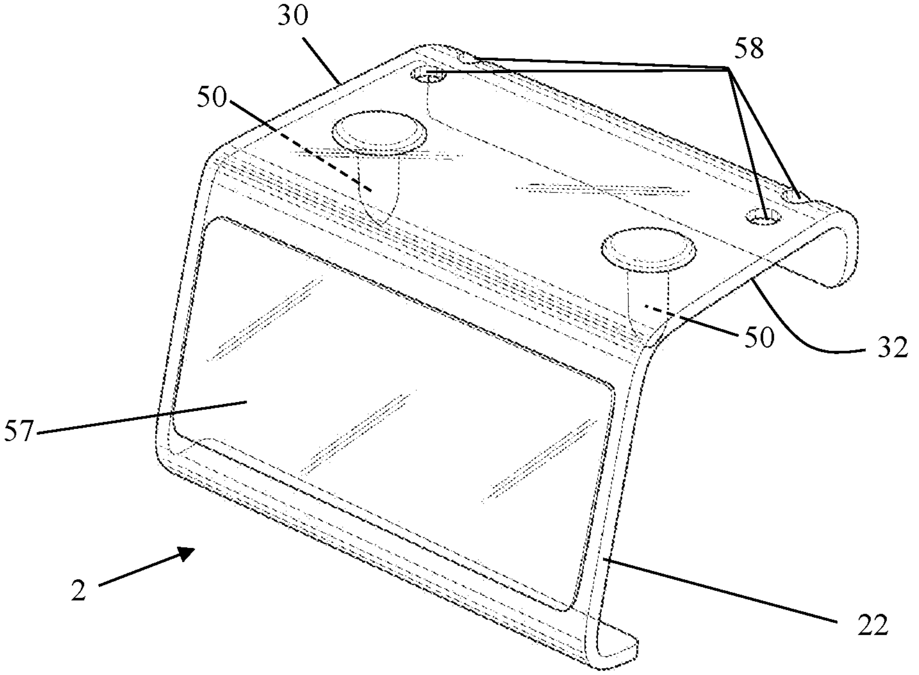
FIG. 2 is a perspective view of the first embodiment of the present invention with a window in the long section.

When installed on ESL assembly 4, apparatus 2's bottom tongue 40 abuts ESL 8's bottom 14, long section 22 covers ESL 8's face 12, short section 24 spans the length between ESL 8's face 12 and ESL basket clip 16's rear of basket member gripping portion 20, and rear lip 34 abuts basket clip 16's rear of basket member gripping portion 20, so that ESL assembly 4 is sandwiched between rear lip 34 and long section 22 on basket member 6. FIG. 2 shows an embodiment with thinner portion 57 in long section 22 as a method to reduce material without sacrificing functionality of apparatus 2. FIG. 2 also shows two shoulders 50 protruding from short section 30's inner face 32, and four holes 58.

Figure 3:
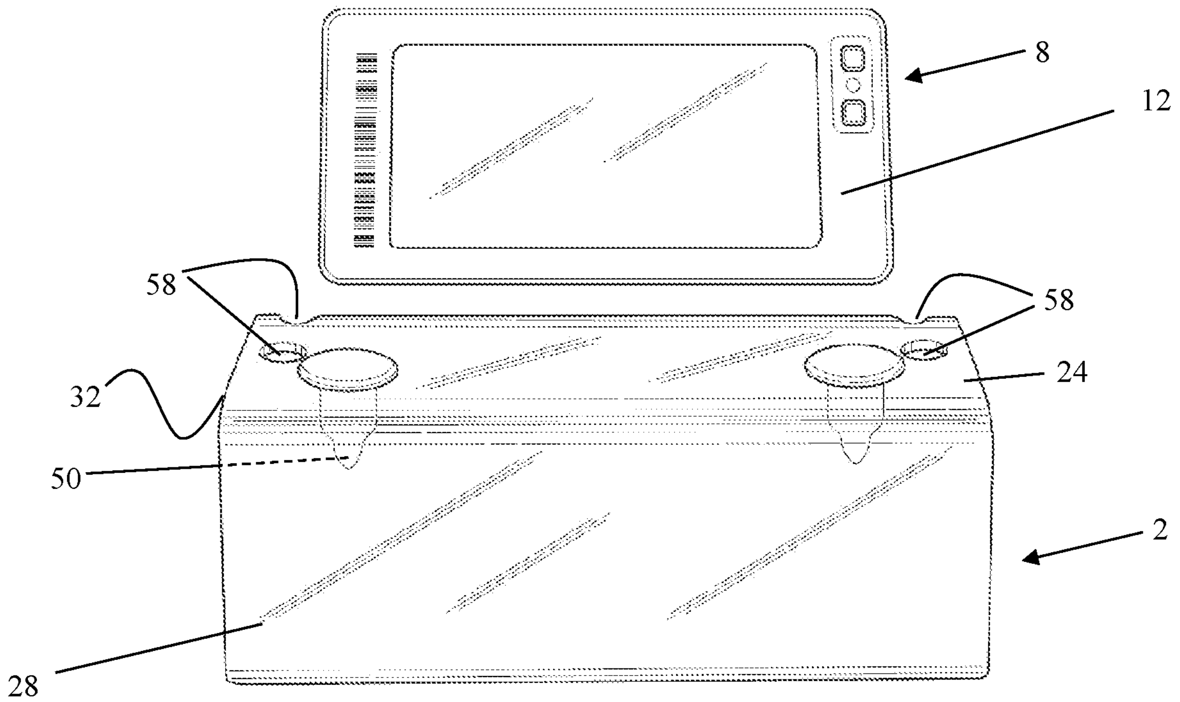
FIG. 3 is a front view of the first embodiment of the present invention in relation to an ESL.

FIG. 3 is a front view of apparatus 2 and ESL 8's front face 12. Apparatus 2 comprises two sets of holes 58 and shoulders 50 in short section 24. Shoulders 50 comprise protrusions extending from short section 24's inner face 32.

Figure 4:
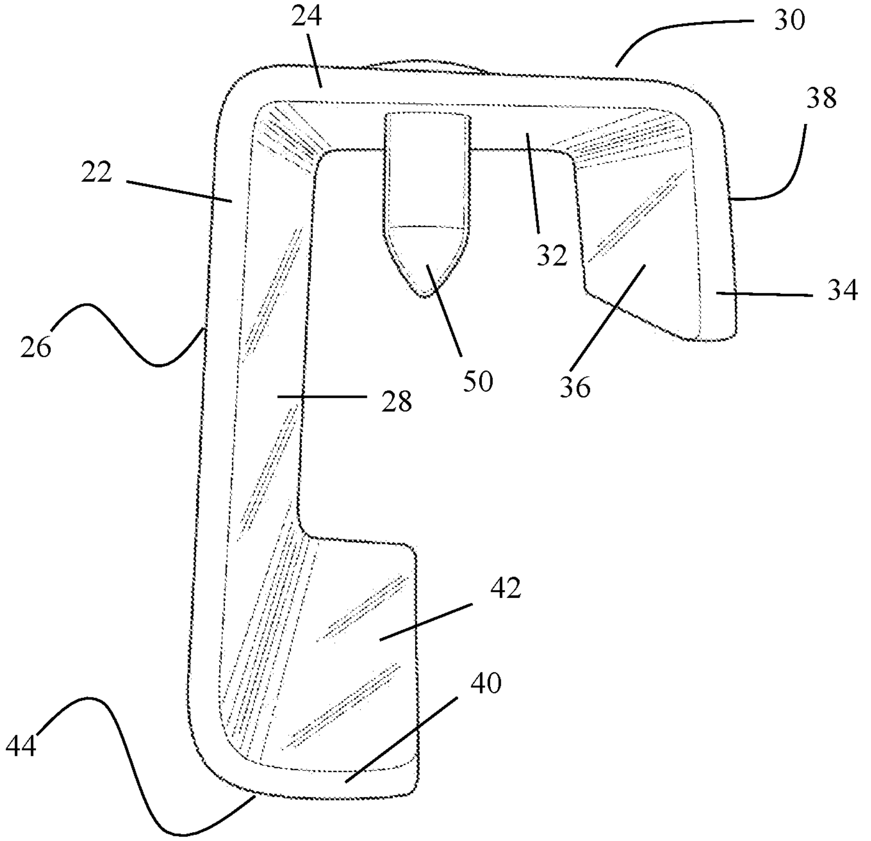
FIG. 4 is a side view of the first embodiment of the present invention.
Figure 5:
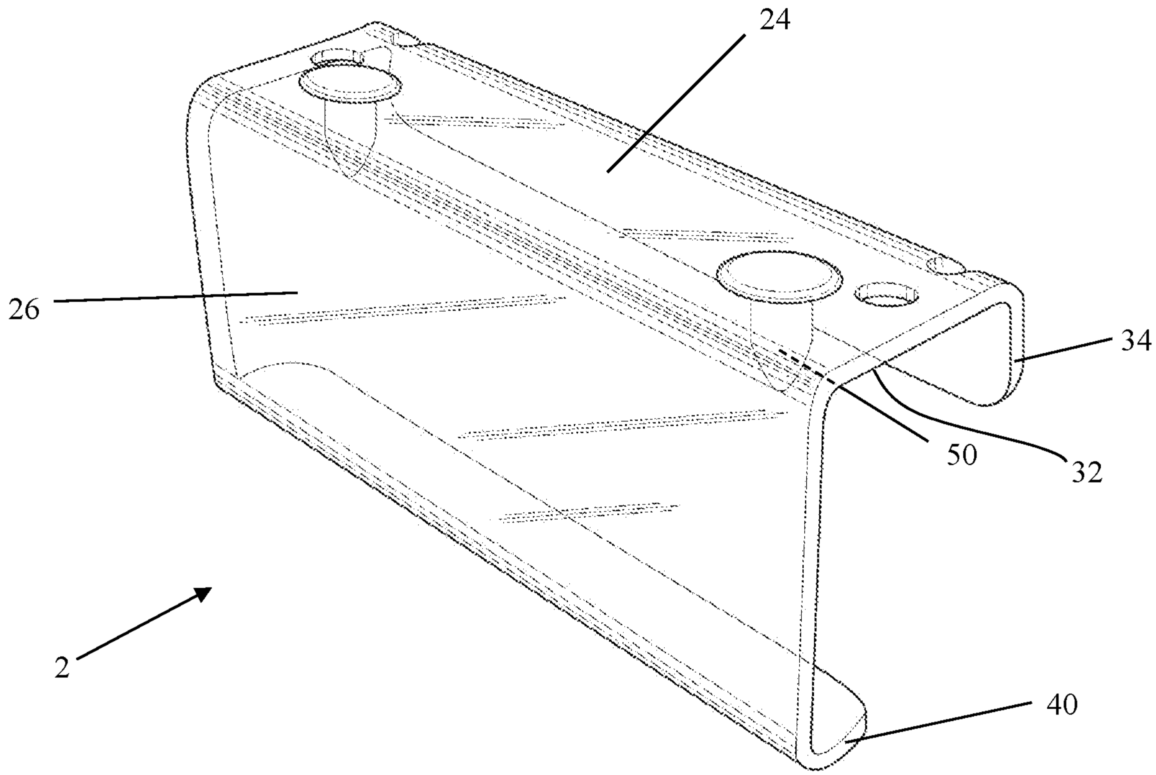
FIG. 5 is a perspective view of the first embodiment of the present invention.

FIG. 4 is a side view of apparatus 2, comprising long section 22 with outer face 26 and inner face 28, short section 24 with outer face 30 and inner face 32, rear lip 34 with outer face 38 and inner face 36, and bottom tongue 40 with outer face 44 and inner face 42. FIG. 5 shows a perspective view of apparatus 2 with shoulders 50 protruding from short section 24's inner face 32.

Figure 6:
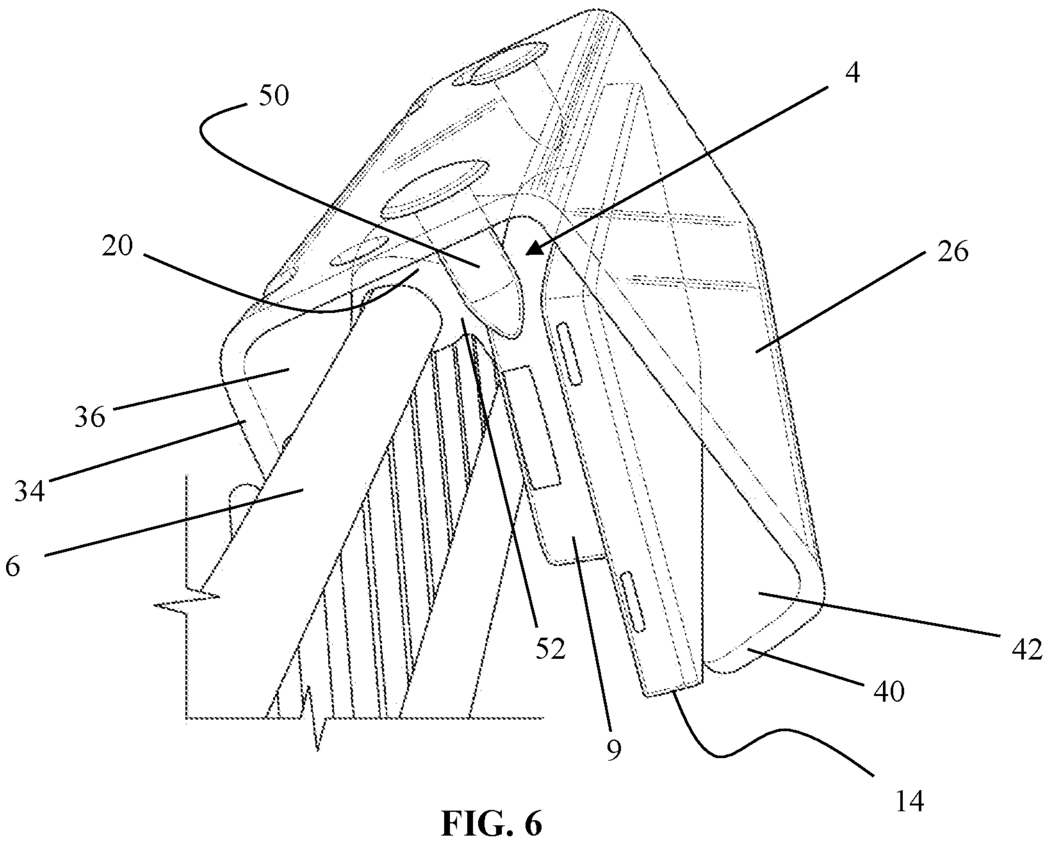
FIG. 6 is a perspective view of the first embodiment of the present invention being installed onto an ESL assembly.
Figure 7:
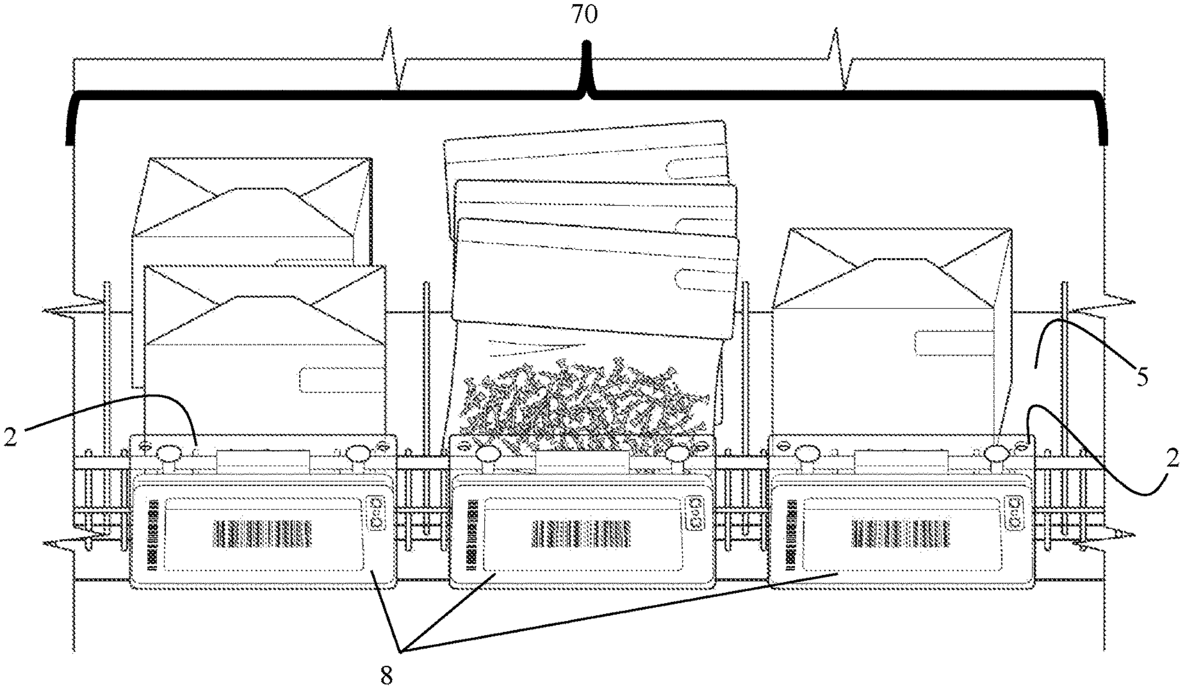
FIG. 7 is a front view of three ESL assemblies protected with the first embodiment of the present invention.

FIG. 6 shows apparatus 2 in mid-installation on ESL assembly 4, wherein rear lip 34's inner face 36 is placed behind basket member gripping portion 20 and bottom tongue 40's inner face 42 being slid underneath ESL 8's bottom 14. Shoulders 50 abut vertical sides of ESL assembly 52 to prevent lateral dislodgement of apparatus 2 off ESL assembly 4. FIG. 7 shows a typical use of apparatus 2 placed over ESL assemblies 4 on retail baskets 5 with products 70 identified with ESLs 8.

Figure 8:
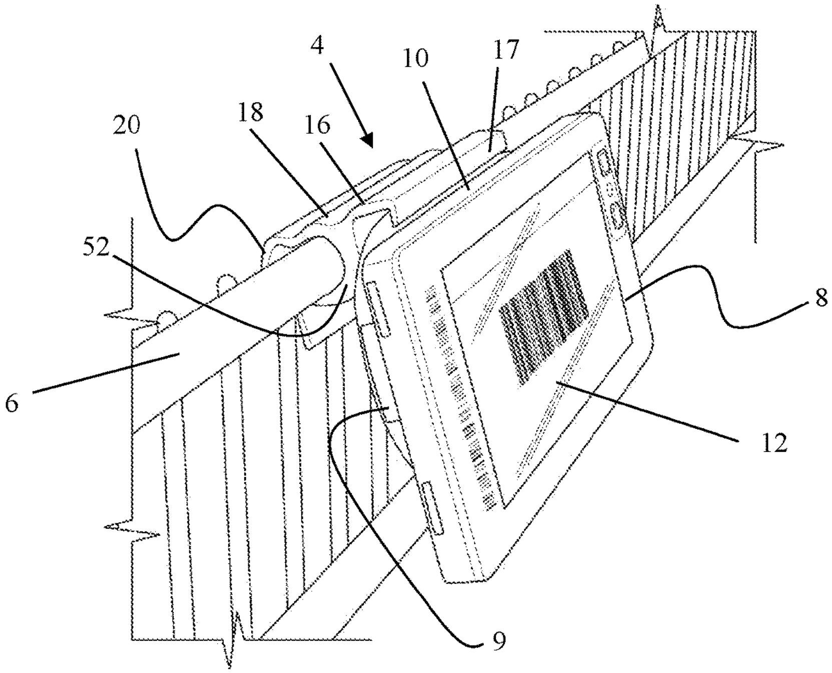
FIG. 8 is a perspective view of an unprotected ESL assembly.
Figure 9:
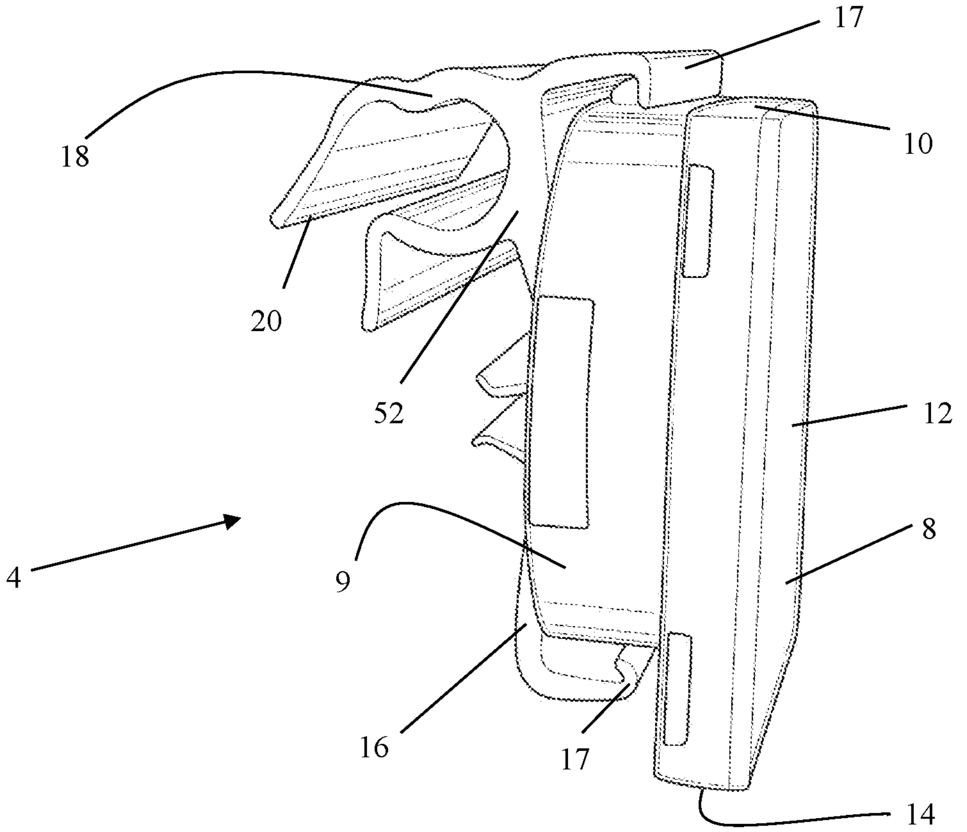
FIG. 9 is a side view of an ESL assembly.

FIG. 8 demonstrates an ESL assembly 4 without apparatus 2, comprising ESL basket clip 16 with ESL-engaging portion 17 holding ESL 8's housing 9, basket member gripping portion 18 attached to basket member 6, sides 52, entire ESL assembly 4 displaying ESL 8's face 12 to the public. A typical basket member gripping portion 18 comprises a semi-circular configuration, the inside portion of gripping portion 18 mates with basket member 6. FIG. 9 is a side view of a typical ESL assembly 4 showing basket clip 16 comprising ESL-engaging portions 17 holding ESL 8, basket member gripping portion 18 comprising rear portion 20, and sides 52. ESL 8 comprises a flat rectangle and housing 9, with ESL top 10, ESL face 12, and ESL bottom 14.

Figure 10:
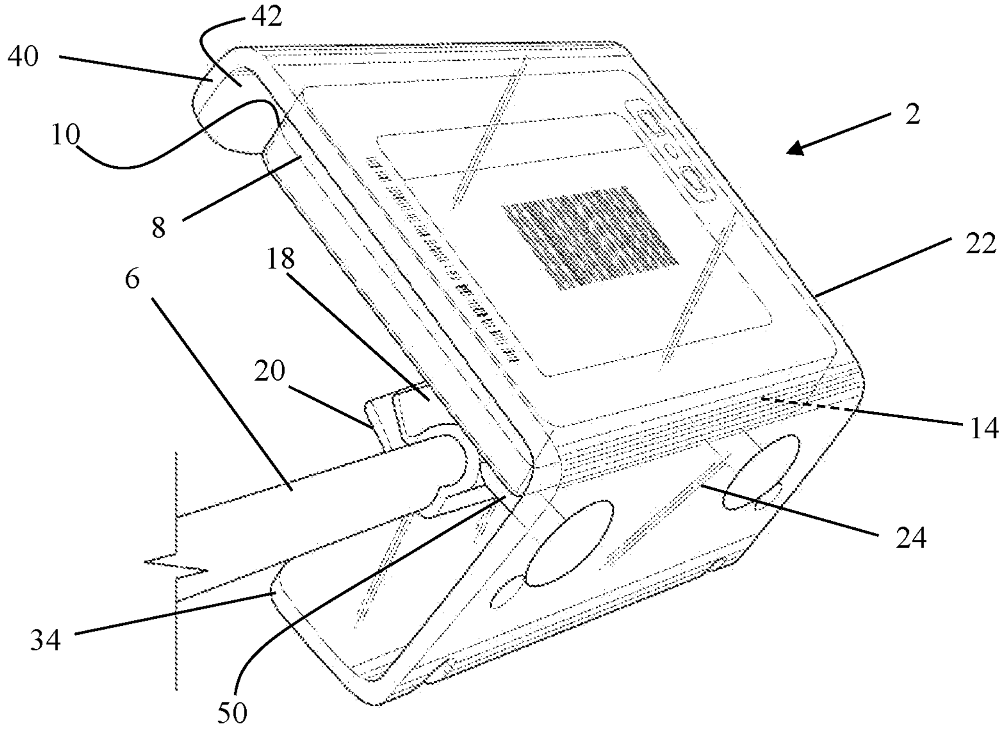
FIG. 10 is a perspective view of another use of the first embodiment of the present invention on an ESL assembly.

FIG. 10 shows another variant of use of apparatus 2, namely upside-down to the views shown on FIGS. 1, 2 and 7. In this variant, bottom tongue 40 abuts ESL 8's top 10 instead of ESL 8's bottom 14, and short section 24 covers ESL 8's bottom 14 instead of ESL 8's top 10.

Figure 11:
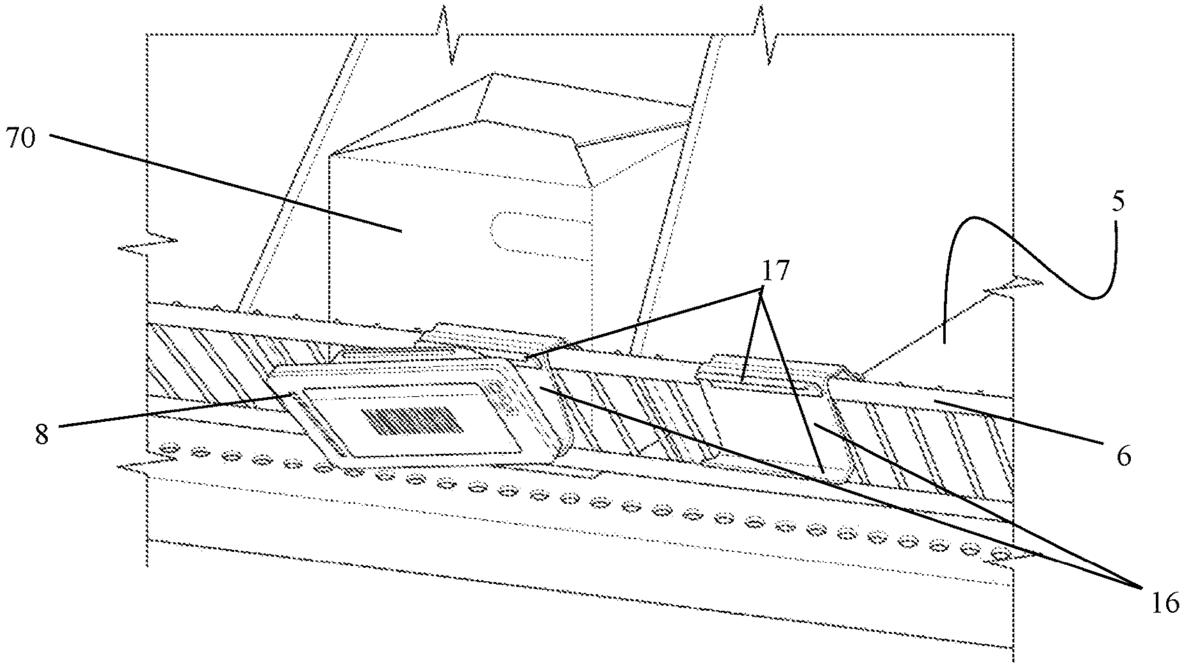
FIG. 11 is a perspective view of an unprotected ESL almost dislodged from a basket clip.

FIG. 11 shows an unprotected ESL assembly 4 wherein ESL 8 has been partially dislodged out of ESL basket clip 16's engaging portions 17 to the point where ESL 8 is almost completely dislodged and at risk of falling on the floor.

Figure 12:
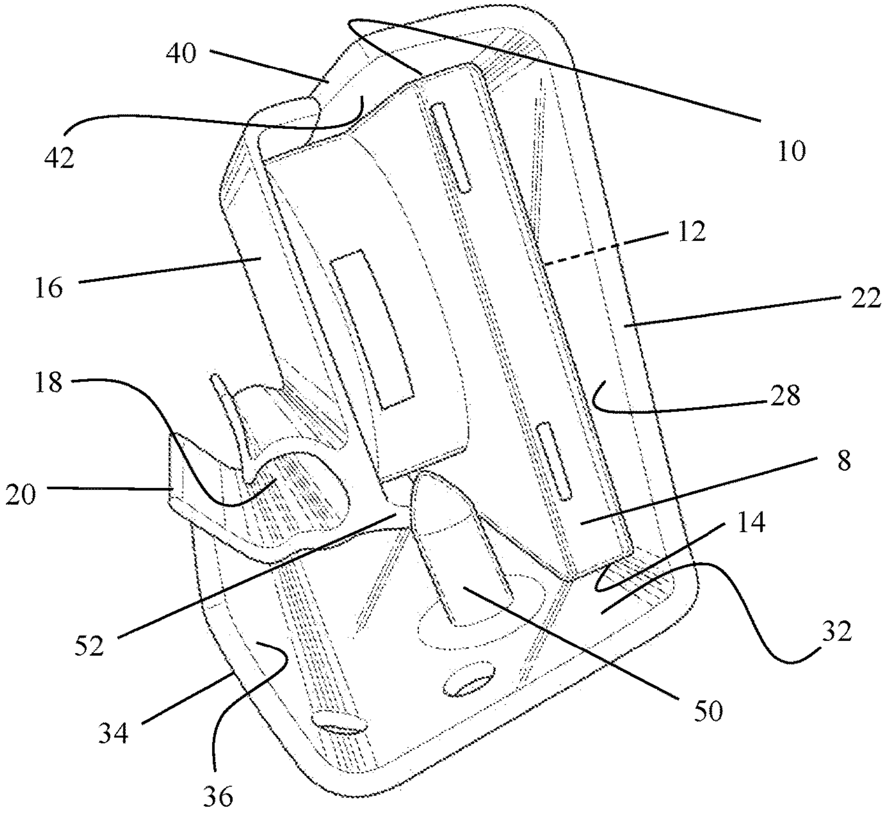
FIG. 12 is a side view of an ESL assembly with another use of the first embodiment of the present invention.

FIG. 12 shows a side view of variant shown on FIG. 10, wherein shoulders 50 abut ESL basket clip 16's sides 52, and rear lip 34's inner face 36 abutting basket member gripping portion 18's rear portion 20. Long section 22's inner face 28 abuts ESL 8's face 12, bottom tongue 40's inner face 42 abuts ESL 8's top 10, and short section 24's inner face 32 abuts ESL bottom 14.

Figure 13:
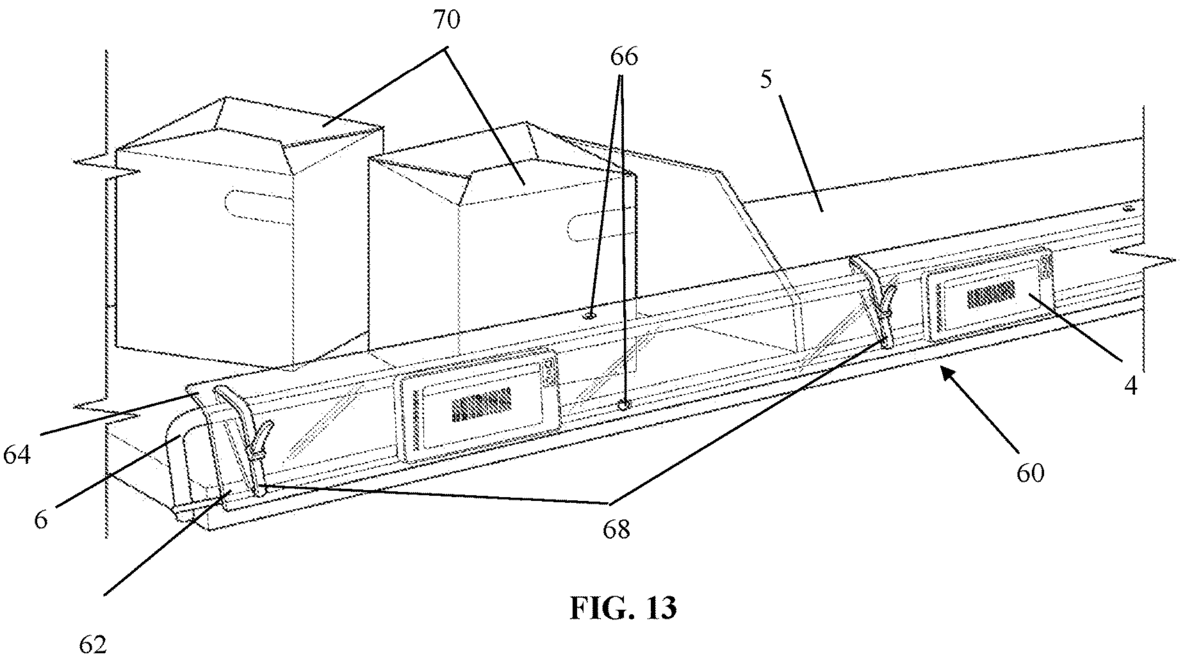
FIG. 13 is a perspective view of the second embodiment of the present invention.
Figure 14:
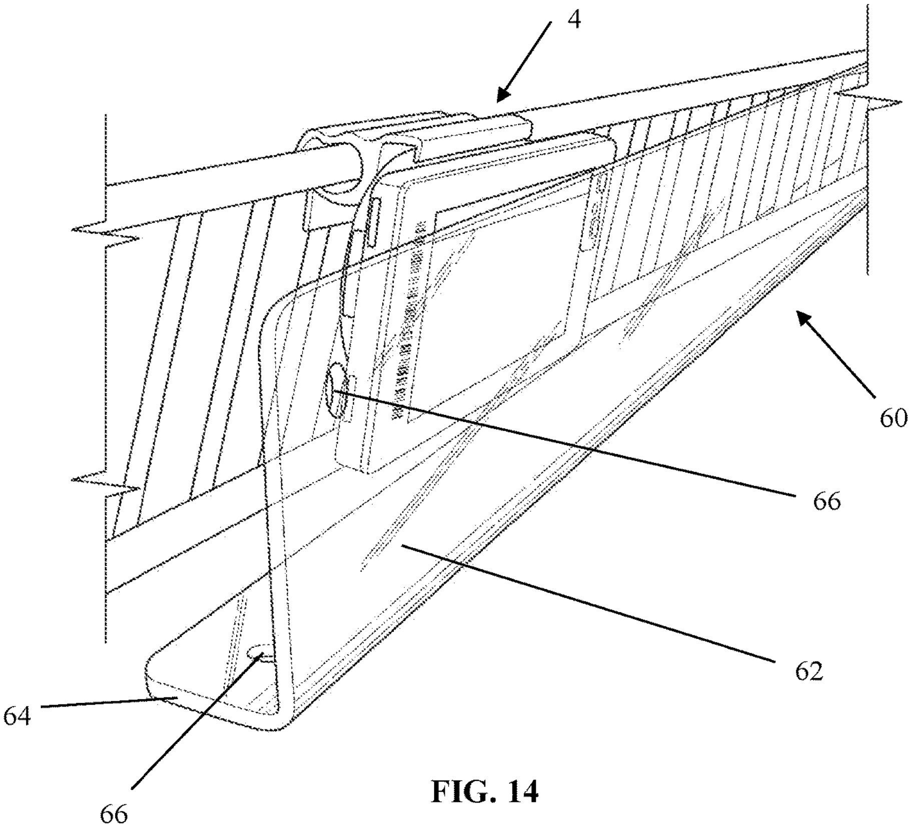
FIG. 14 is a side view of another use of the second embodiment of the present invention.

FIG. 13 demonstrates the second embodiment of the present invention, apparatus 60, to protect a plurality of ESL assemblies 4 on retail basket 5's wire members 6. Apparatus 60 comprises long section 62 and short section 64 connected at an angle, with sets of holes 66 to be attached to basket member 6 using fasteners 68. Short section 64 is oriented above long section In the preferred embodiment, fasteners 68 comprise zip ties. FIG. 14 shows a variant of use of apparatus 60, namely upside-down to the use shown on FIG. 13, wherein short section 64 is oriented below long section 62.

Apparatus 2 can be manufactured in many different ways. One of the least-expensive ways is molding because it is possible to omit material in apparatus 2's areas where it is not structurally necessary, thereby lowering costs. FIGS. 15 to 23 show embodiments with omitted material.

Figure 15:
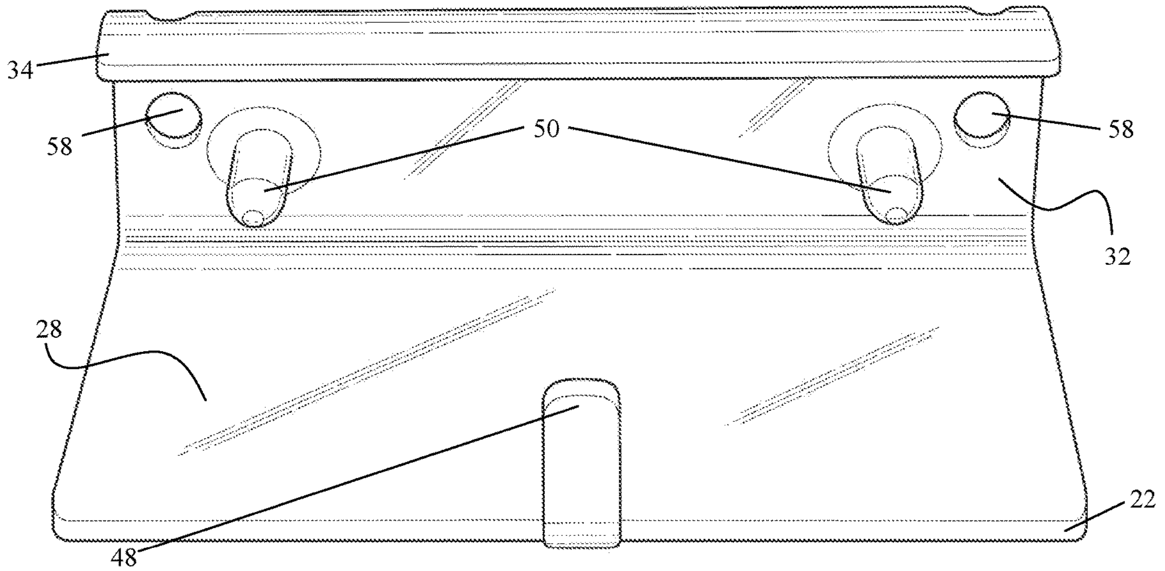
FIG. 15 is a rear view of a variant of the first embodiment of the present invention with a short tongue.
Figure 16:
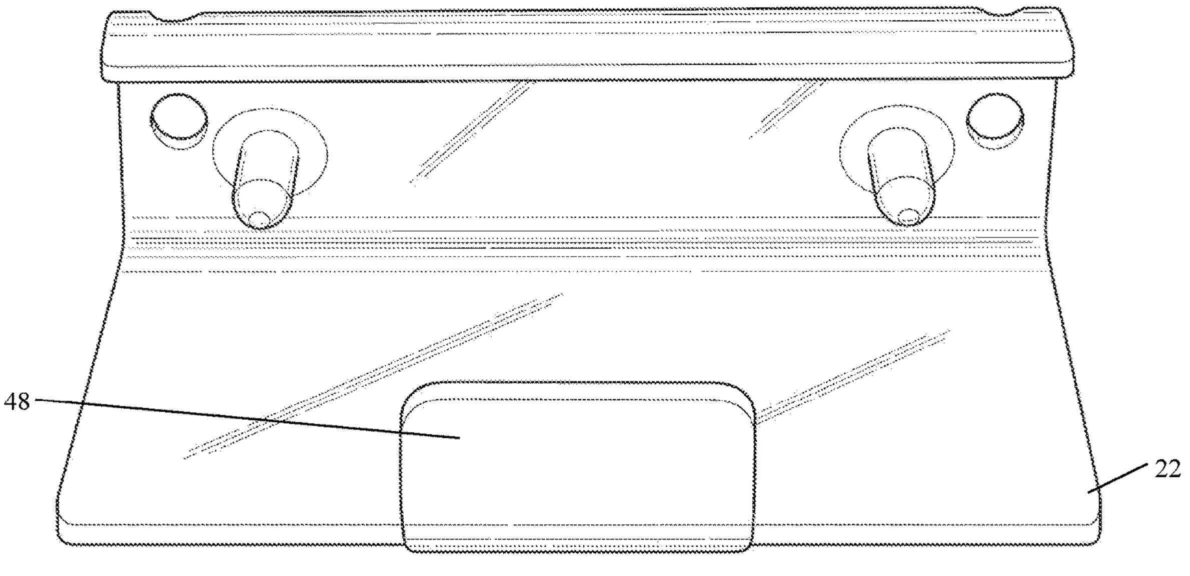
FIG. 16 is a rear view of a variant of the first embodiment of the present invention with a medium tongue.
Figure 17:
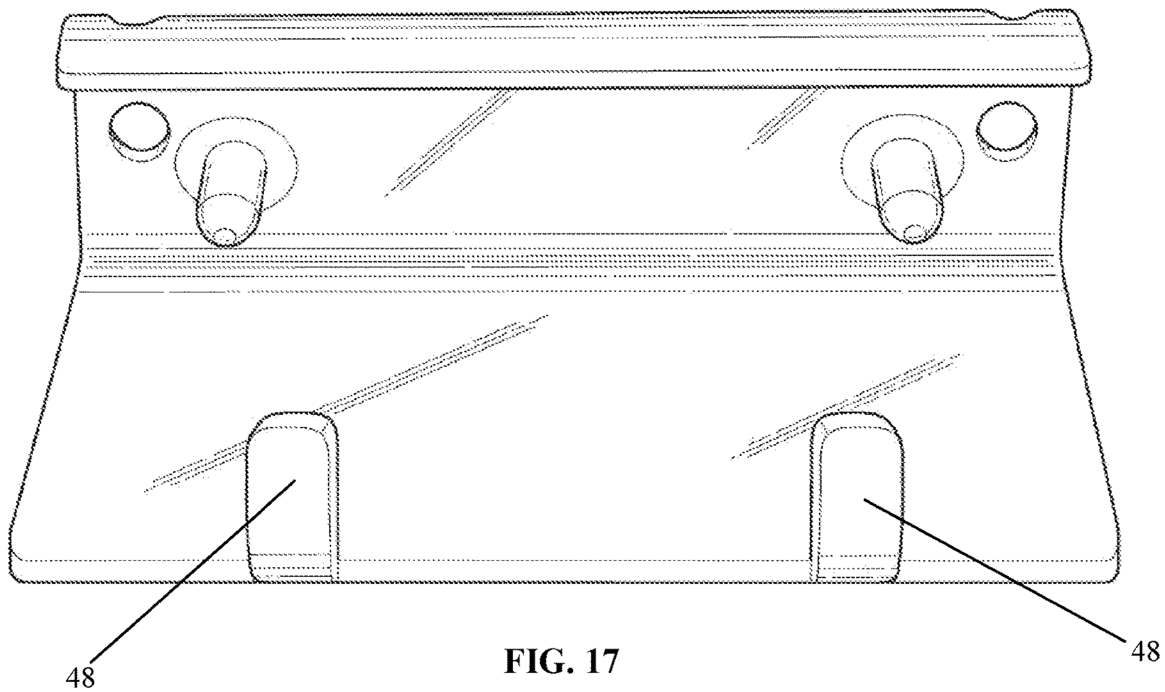
FIG. 17 is a rear view of a variant of the first embodiment of the present invention with two short tongues.

One such embodiment is shortening bottom tongue 40 from 100% of the length of long section 22 down to as little as 1% of the length of long section 22. FIG. 15 shows apparatus 2 with short bottom tongue 48 oriented substantially in the midway point of long section 22. FIG. 16 shows another variant of short bottom tongue 48. FIG. 17 shows a variant of two short bottom tongues 48.

Figure 18:
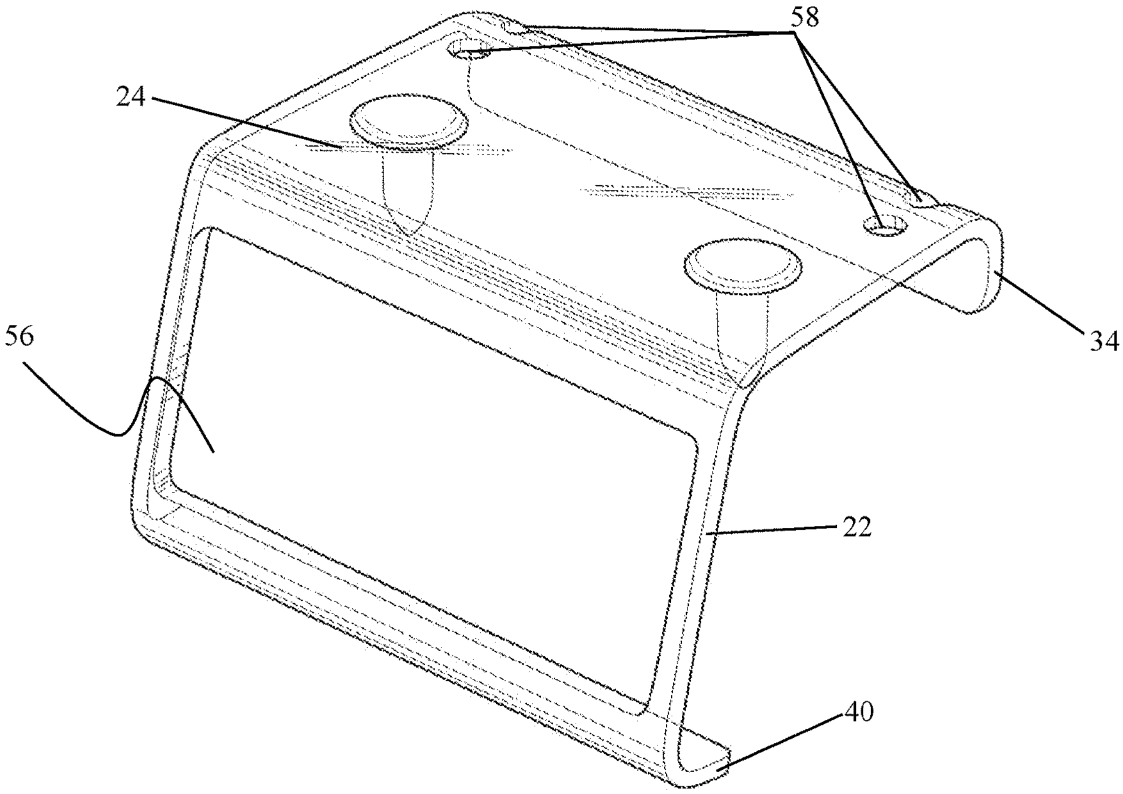
FIG. 18 is a perspective view of the first embodiment of the present invention with an aperture in the long section.

FIG. 18 shows an embodiment of apparatus 2 with aperture 56 in long section 22, wherein material is completely omitted in the central area of long section 22 because it is not needed.

Figure 19:
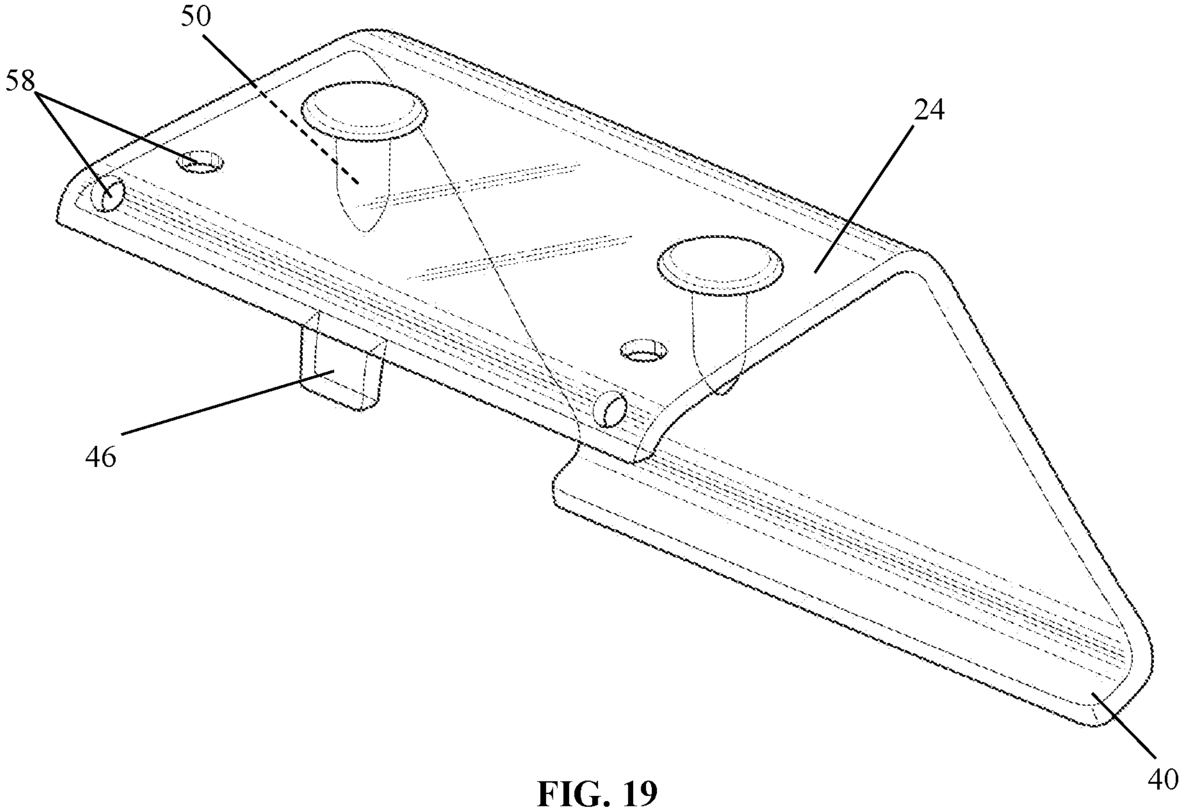
FIG. 19 is a perspective rear view of a variant of the first embodiment of the present invention with a short lip.
Figure 20:
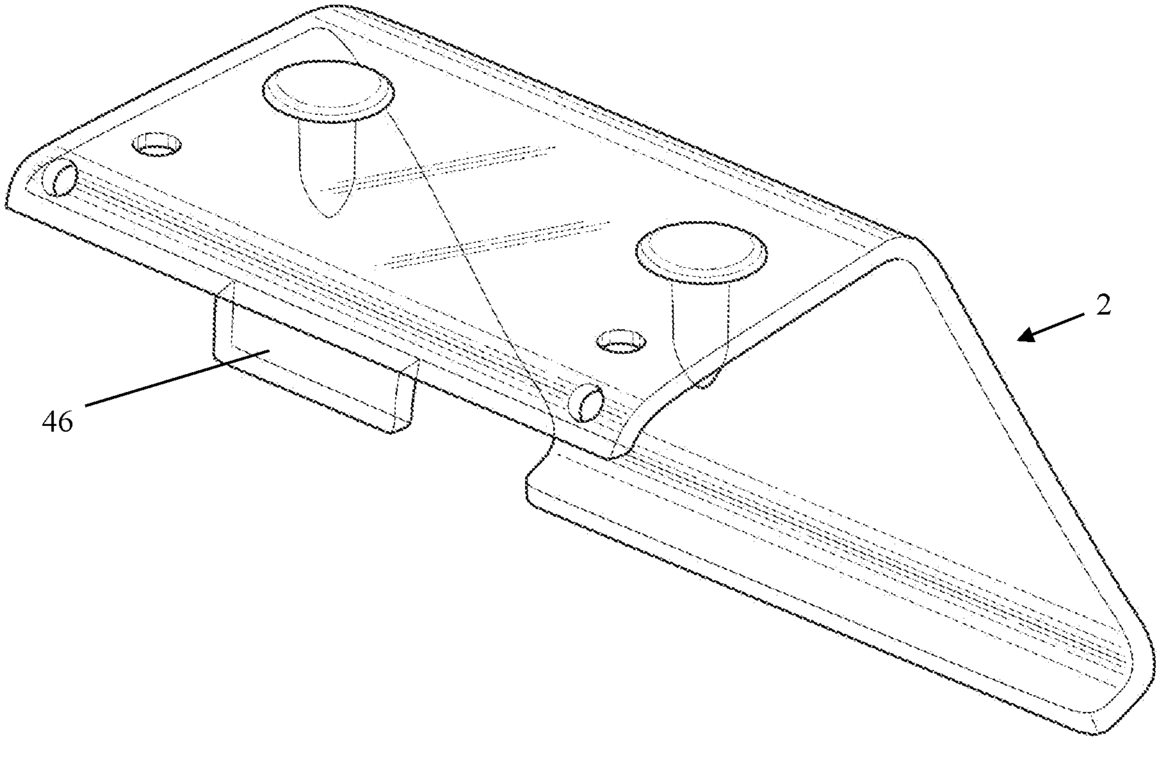
FIG. 20 is a perspective rear view of a variant of the first embodiment of the present invention with a medium lip.
Figure 21:
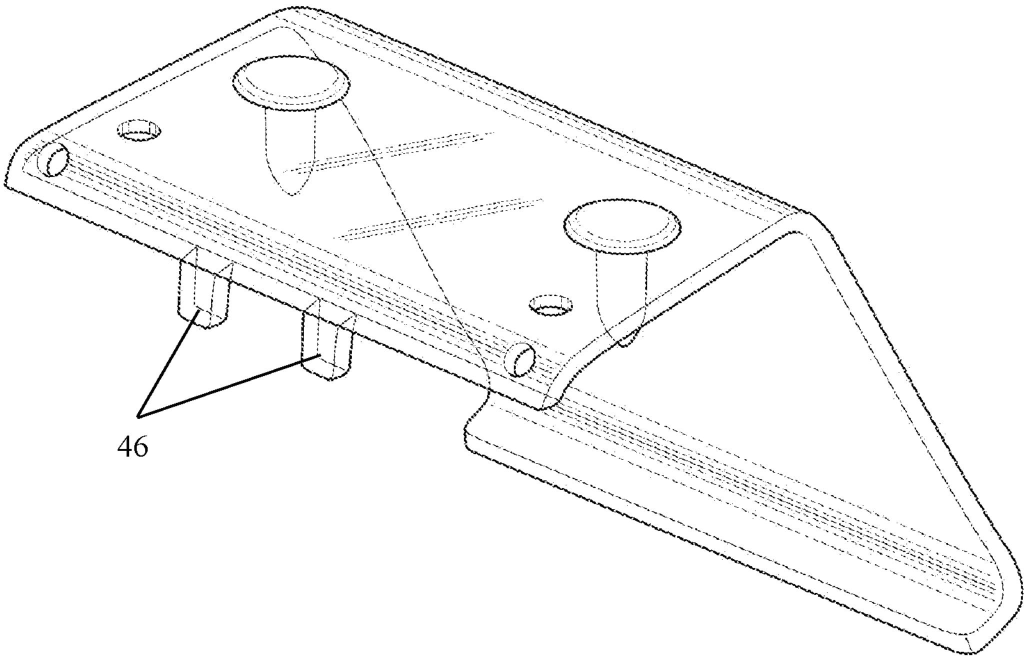
FIG. 21 is a perspective rear view of a variant of the first embodiment of the present invention with two short lips.

Another way to save material is to shorten rear lip 34 from 100% of the length of short section 24 down to as little as 1% of the length of short section 24. FIG. 19 shows an embodiment of apparatus 2 with a shortened rear lip 46 oriented substantially in the midway point of short section 24. FIG. 20 shows a variant of shortened rear lip 46. FIG. 21 shows a variant with two shortened rear lips 46.

Figure 22:
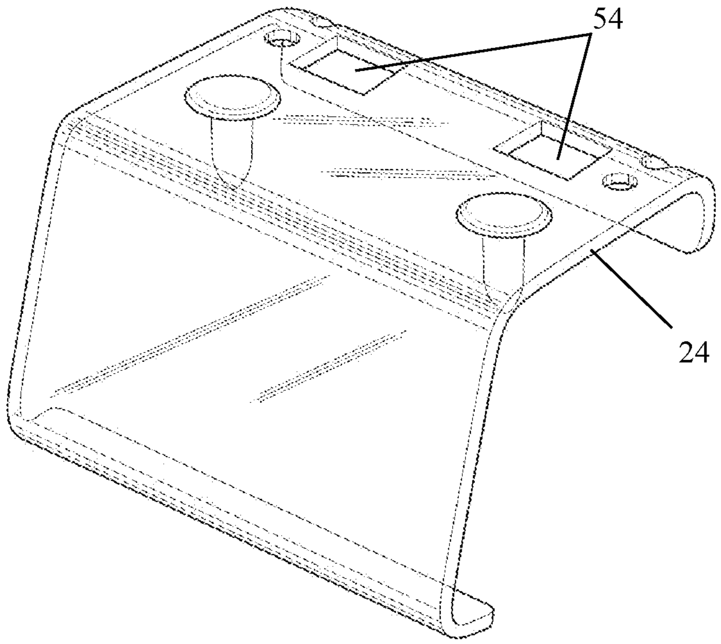
FIG. 22 is a perspective view of the first embodiment of the present invention with apertures in the short section.
Figure 23:
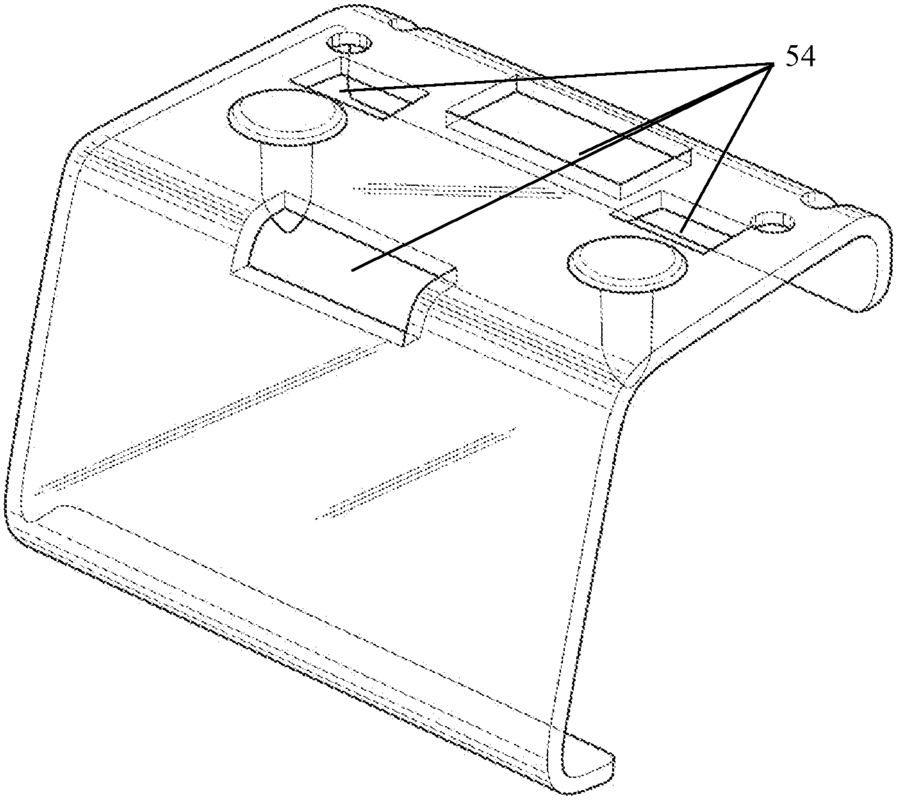
FIG. 23 is a perspective view of the first embodiment of the present invention with added apertures in the short section.

FIGS. 22 and 23 show embodiments of apparatus 2 with apertures 54 in short section 24. Apertures 54 comprise absence of material that is unnecessary for structural integrity of apparatus 2.

Figure 24:
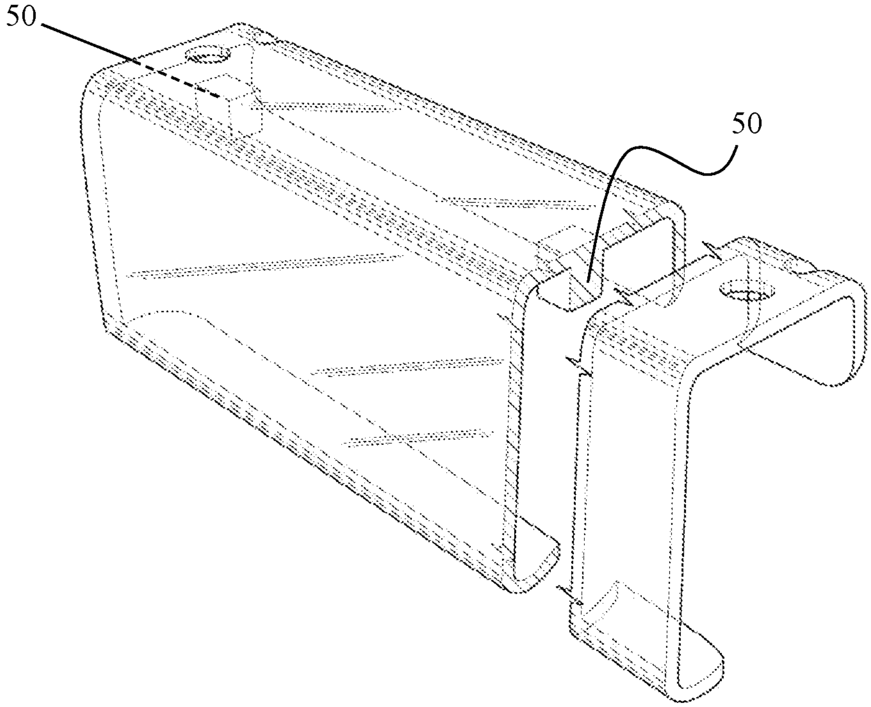
FIG. 24 is a perspective view of the first embodiment of the present invention with molded shoulders.

FIG. 24 shows a variant of shoulders 50, wherein blocks are directly molded into apparatus 2's body.

Figure 25:
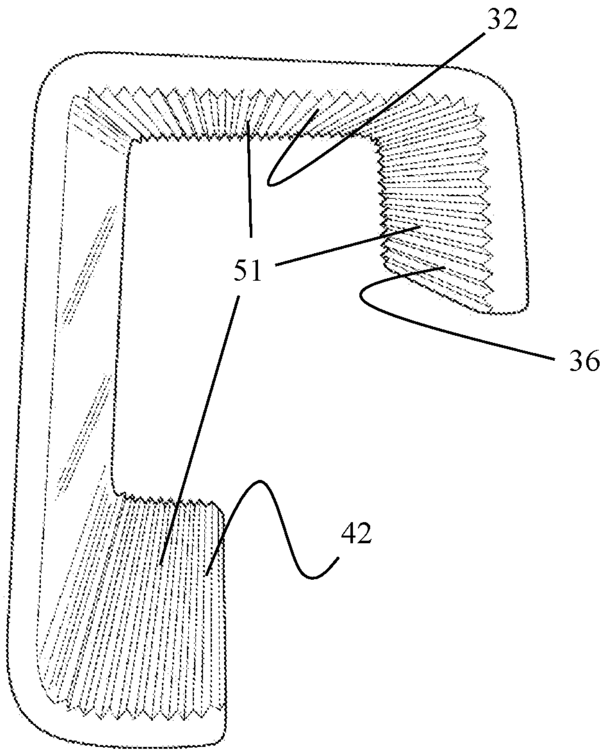
FIG. 25 is a perspective view of the first embodiment of the present invention with friction locks.

FIG. 25 shows another embodiment of apparatus 2 without shoulders 50, and instead using friction locks 51. Friction locks 51 comprise an abraded or abrasive surface on one or more of the following surfaces: short section 24's inner face 32, rear lip 34's inner face 36, and/or bottom tongue 40's inner face 42. Friction locks 51 abut one or more of the following surfaces: ESL 8's top 10, bottom 14, and/or rear of basket member gripping portion 20. Apparatus 2 prevents dislocation of ESL assembly 4 due to friction provided by friction locks 51. If apparatus 2 were manufactured using an extrusion process, friction locks 51 may be rubber-like strips.

To use apparatus 2, referring to FIGS. 1 and 9, a user installs ESL 8 into ESL basket clip 16 by clipping ESL 8 into ESL engaging portions 17, thereby creating ESL assembly 4. Referring to FIG. 8, user clips ESL assembly 4 onto a member of retail basket 6 via basket member gripping portion 18 so that ESL face 12 is oriented towards customers.

Apparatus 2 is positioned over ESL assembly 4, as seen on FIG. 6, so that shoulders 50 abut sides of ESL assembly 52, rear lip 34's inner face 36 abuts rear of basket member gripping portion 20, long section 22's inner face 28 aligns with ESL face 12, and bottom tongue 40's inner face 42 comes in contact with ESL 8's bottom 14.

As seen on FIG. 1, user applies pressure on apparatus 2 so that bottom tongue 40's inner face 42 mates with ESL 8's bottom 14, thereby mating long section 22's inner face 28 (seen on FIG. 4) with ESL face 12. As a final result, ESL basket clip 16's basket member gripping portion 18 is sandwiched between rear lip 34's inner face 36 and long section 22's inner face 28 (both seen on FIG. 4) so that basket member gripping portion 18 is constricted onto member of retail basket 6 to prevent dislocation of ESL assembly 4, and ESL assembly 4's sides 52 are sandwiched between shoulders 50 (seen on FIG. 6) to prevent lateral dislocation of apparatus 2 off ESL assembly 4. To further prevent dislocation of apparatus 2, fasteners such as zip ties can be used to attach apparatus 2 to member of retail basket 6 using holes 58.

FIGS. 10 and 12 show a variant of use for apparatus 2, wherein ESL assembly 4 is installed upside-down to the view shown on FIG. 1. In this variant, bottom tongue 40's inner face 42 mates with ESL 8's top 10, rear lip 34's inner face 36 abuts rear of basket member gripping portion 20, and short section 24's inner face 32 abuts ESL 8's bottom 14.

Use of the second embodiment 60 for a plurality of ESL assemblies 4 is shown on FIGS. 13 and 14. In one variant, apparatus 60's short section 64 is oriented above long section 62, apparatus 60 is placed over a plurality of ESL assemblies 4 and secured on member of retail basket 6 using fasteners 68 threaded through holes 66. In another variant, apparatus 60's short section 64 is oriented below long section 62, and apparatus 60 is affixed over a plurality of ESL assemblies 4 on member of retail basket 6 using fasteners 68 threaded through holes 66.

As mentioned, apparatus 2 can be economically manufactured by molding, which offers opportunities to reduce material in areas that are not structurally significant without sacrificing functionality of apparatus 2. As an example, FIGS. 15 to 17 show non-exhaustive variants to substitute bottom tongue 40 for short bottom tongue(s) 48. Bottom tongue(s) 48 can be as short as 1% of the length of long section 22, particularly if apparatus 2 is made of metal.

Another example of reducing material is seen on FIGS. 19 to 21, wherein rear lip 34 is substituted by short rear lip(s) 46, which can be as short as 1% of the length of short section 24, particularly if apparatus 2 is made of metal.

Yet another example of reducing material for manufacture of apparatus 2 is demonstrated on FIGS. 2 and 18, wherein a portion of long section 22 is either made with no material, being aperture 56 (FIG. 18), or a portion of long section 22 having a thinner window of material 57 (FIG. 2). Still another example of reducing material for manufacture of apparatus 2 is shown on FIGS. 22 and 23, with apertures 54 in short section 24. The material removed on apertures 54 serves little purpose and is unnecessary for structural integrity of apparatus 2.

FIG. 24 demonstrates a variant of shoulders 50 if apparatus 2 is manufactured by molding. Shoulders 50 shown on FIG. 24 can be of any shape as long as they abut sides 52 of ESL assembly 4, and the rectangular configuration shown is for illustration purposes only.

A variant of apparatus 2 can be made without shoulders 50 by using friction locks 51 as seen on FIG. 25. Surfaces of bottom tongue 40's inner face 42, rear lip 34's inner face 36, and short section 24's inner face 32 can be modified with friction locks 51 such as teeth shown on FIG. 25. Such friction locks 51 will prevent apparatus 2 from being laterally dislodged off ESL assembly 4.

Apparatus 2 can be made of any durable and resilient material such as plastic, metal, or any other suitable material.

The invention claimed is:

1. An apparatus for inhibiting dislocation of an Electronic Shelf Label (ESL) assembly, wherein said ESL assembly is mounted onto a member of a retail basket, said ESL assembly comprising an Electronic Shelf Label (ESL) attached to a basket clip, said clip adapted to be mounted on a retail basket member via a basket clip engaging portion that grips said member of retail basket, said apparatus for inhibiting dislocation comprising a long planar section and a short planar section, said sections connected at an angle, said long planar section comprising an outer and inner face, said short planar section comprising an outer and inner face at least one rear planar lip connected to said short section, said rear lip comprising an outer and inner face, at least one bottom planar tongue connected to said long section, said bottom tongue comprising an outer and inner face, wherein, in operating mode, said apparatus is affixed to said ESL assembly so that said rear lip's inner face abuts a rear portion of said basket clip engaging portion, said short section's inner face abuts a top portion of said ESL, said long section's inner face abuts a front face of said ESL, and said bottom tongue's inner face abuts a bottom portion of said ESL, said apparatus being firmly attached to said ESL assembly so that said basket clip engaging portion is constricted on said retail basket member to inhibit dislocation of said ESL assembly off said retail basket member.

2. An apparatus for inhibiting dislocation of an Electronic Shelf Label (ESL) assembly according to claim 1, wherein said bottom planar tongue is 100% of the length of said long planar section.

3. An apparatus for inhibiting dislocation of an Electronic Shelf Label (ESL) assembly according to claim 1, wherein said bottom planar tongue is at least 1% the length of said long planar section.

4. An apparatus for inhibiting dislocation of an Electronic Shelf Label (ESL) assembly according to claim 1, wherein said rear planar lip is 100% of the length of said short planar section.

5. An apparatus for inhibiting dislocation of an Electronic Shelf Label (ESL) assembly according to claim 1, wherein said rear planar lip is at least 1% of the length of said short planar section.

6. An apparatus for inhibiting dislocation of an Electronic Shelf Label (ESL) assembly according to claim 1, wherein said short section's inner face comprises two shoulders, said shoulders abutting sides of said ESL assembly in operating mode to inhibit lateral dislocation of said apparatus from said ESL assembly.

7. An apparatus for inhibiting dislocation of an Electronic Shelf Label (ESL) assembly according to claim 1, wherein said angle between said long and short planar sections is substantially 90 degrees.

8. An apparatus for inhibiting dislocation of an Electronic Shelf Label (ESL) assembly according to claim 1, wherein said short planar section and said rear lip are connected at an angle of substantially 90 degrees.

9. An apparatus for inhibiting dislocation of an Electronic Shelf Label (ESL) assembly according to claim 1, wherein said long planar section and said bottom planar tongue are connected at an angle of substantially 90 degrees.

10. An apparatus for inhibiting dislocation of an Electronic Shelf Label (ESL) assembly according to claim 1, wherein said apparatus is made of a resilient and durable material.

11. An apparatus for inhibiting dislocation of an Electronic Shelf Label (ESL) assembly according to claim 10, wherein said material is transparent plastic.

12. An apparatus for inhibiting dislocation of an Electronic Shelf Label (ESL) assembly according to claim 1, wherein said long planar section comprises an aperture.

13. An apparatus for inhibiting dislocation of an Electronic Shelf Label (ESL) assembly according to claim 1, wherein said short planar section comprises an aperture.

14. An apparatus for inhibiting dislocation of an Electronic Shelf Label (ESL) assembly according to claim 1, wherein said rear lip comprises an aperture.

15. An apparatus for inhibiting dislocation of an Electronic Shelf Label (ESL) assembly according to claim 1, wherein said bottom tongue comprises an aperture.

16. An apparatus for inhibiting dislocation of an Electronic Shelf Label (ESL) assembly according to claim 1, wherein said short planar section comprises holes for mounting to said member via fasteners.

17. An apparatus for inhibiting dislocation of a plurality of Electronic Shelf Label (ESL) assemblies, wherein said ESL assemblies are mounted onto members of contiguous retail baskets, each of said ESL assemblies comprising an Electronic Shelf Label (ESL) attached to a basket clip, said basket clip adapted to be mounted on a retail basket member, said apparatus for inhibiting dislocation comprising a long planar section and a short planar section, said sections connected at an angle, said long planar section comprising an outer and an inner face, said short planar section comprising an outer and an inner face, at least four sets of through-holes along said apparatus's length, each set of holes being one hole in said long planar section and one hole in said short planar section, each set oriented at a vertical plane with relation to said apparatus, wherein in operating mode, said long planar section's inner face partially abuts front face portions of said ESLs, said apparatus being made of a transparent and durable material.

18. An apparatus for inhibiting dislocation of a plurality of Electronic Shelf

Label (ESL) assemblies according to claim 17, wherein said apparatus is affixed to said retail bas kets via metal, or plastic fasteners.

19. An apparatus for inhibiting dislocation of an Electronic Shelf Label (ESL) assembly, wherein said ESL assembly is mounted onto a member of a retail basket, said ESL assembly comprising an Electronic Shelf Label (ESL) attached to a basket clip, said clip adapted to be mounted on a retail basket member via a basket clip engaging portion that grips said member of retail basket, said apparatus for inhibiting dislocation comprising a long planar section and a short planar section, said sections connected at an angle, said long planar section comprising an outer and inner face, said short planar section comprising an outer and inner face at least one rear planar lip connected to said short section, said rear lip comprising an outer and inner face, at least one bottom planar tongue connected to said long section, said bottom tongue comprising an outer and inner face, wherein, in operating mode, said apparatus is affixed to said ESL assembly so that said rear lip's inner face abuts a rear portion of said ESL assembly, said short section's inner face abuts a top portion of said ESL, said long section's inner face abuts a front face of said ESL, and said bottom tongue's inner face abuts a bottom portion of said ESL, said apparatus being firmly attached to said ESL assembly to protect said ESL from impact.

20. An apparatus for inhibiting dislocation of an Electronic Shelf Label (ESL) assembly according to claim 19, wherein said short section's inner face comprises two shoulders.

* * * * *